(12) United States Patent
Pezeshki et al.

(10) Patent No.: US 11,728,859 B2
(45) Date of Patent: Aug. 15, 2023

(54) CAPABILITY REPORT FOR DIGITAL BEAMFORMING CONFIGURATION

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US)

(73) Assignee: QUALCOMM Incorporated, San Diego, CA (US)

(\*) Notice: Subject to any disclaimer, the term of this patent is extended or adjusted under 35 U.S.C. 154(b) by 0 days.

(21) Appl. No.: 17/443,218

(22) Filed: Jul. 22, 2021

(65) Prior Publication Data

US 2022/0029679 A1    Jan. 27, 2022

Related U.S. Application Data

(60) Provisional application No. 62/705,985, filed on Jul. 24, 2020, provisional application No. 62/705,982, filed on Jul. 24, 2020.

(51) Int. Cl.
*H04B 7/06* (2006.01)
*H04W 72/20* (2023.01)
*H04W 72/51* (2023.01)

(52) U.S. Cl.
CPC .......... *H04B 7/0617* (2013.01); *H04B 7/063* (2013.01); *H04B 7/0628* (2013.01); *H04W 72/20* (2023.01); *H04W 72/51* (2023.01)

(58) Field of Classification Search
CPC .................................................... H04B 7/0617
USPC .......................................................... 375/267
See application file for complete search history.

(56) References Cited

U.S. PATENT DOCUMENTS

| | | | |
|---|---|---|---|
| 2013/0229307 A1* | 9/2013 | Chang | H01Q 25/00 342/372 |
| 2018/0270844 A1* | 9/2018 | Kim | H04B 7/0617 |
| 2019/0020456 A1* | 1/2019 | Saxena | H04L 5/0064 |
| 2019/0372734 A1* | 12/2019 | Choi | H04B 7/0628 |
| 2020/0068492 A1* | 2/2020 | Lee | H04W 52/0261 |
| 2020/0229271 A1* | 7/2020 | You | H04W 56/001 |
| 2021/0273686 A1* | 9/2021 | Jansson | H04B 7/0408 |
| 2022/0007406 A1* | 1/2022 | Matsumura | H04B 7/0602 |

\* cited by examiner

*Primary Examiner* — Lihong Yu

(74) *Attorney, Agent, or Firm* — Arun Swain; Harrity & Harrity, LLP

(57) ABSTRACT

Various aspects of the present disclosure generally relate to wireless communication. In some aspects, a user equipment (UE) may transmit capability information including information regarding a beamforming capability of the UE; receive configuration information indicating a beamforming configuration, wherein the beamforming configuration is based at least in part on digital beamforming, analog beamforming, or a combination thereof; and communicate in accordance with the beamforming configuration. Numerous other aspects are provided.

30 Claims, 9 Drawing Sheets

CAPABILITY REPORT FOR DIGITAL BEAMFORMING CONFIGURATION

CROSS-REFERENCE TO RELATED APPLICATIONS

This patent application claims priority to U.S. Provisional Patent Application No. 62/705,982, filed on Jul. 24, 2020, entitled "CAPABILITY REPORT FOR DIGITAL BEAMFORMING CONFIGURATION," and to U.S. Provisional Patent Application No. 62/705,985, filed on Jul. 24, 2020, entitled "INDICATIONS OF ANALOG TO DIGITAL CONVERTER RESOLUTION FOR A DIGITAL BEAMFORMING MODE," both assigned to the assignee hereof. The disclosure of the prior applications is considered part of and is incorporated by reference into this patent application.

FIELD OF THE DISCLOSURE

Aspects of the present disclosure generally relate to wireless communication and to techniques and apparatuses for a capability report for digital beamforming configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting capability information including information regarding a beamforming capability of the UE; receiving configuration information indicating a beamforming configuration, wherein the beamforming configuration is based at least in part on digital beamforming, analog beamforming, or a combination thereof; and communicating in accordance with the beamforming configuration.

In some aspects, a method of wireless communication, performed by a base station, may include receiving capability information including information regarding a beamforming capability of a UE; transmitting configuration information indicating a beamforming configuration, wherein the beamforming configuration is based at least in part on digital beamforming, analog beamforming, or a combination thereof; and communicating based at least in part on the beamforming configuration.

In some aspects, a user equipment for wireless communication may include a memory and one or more processors coupled to the memory. The memory and the one or more processors may be configured to transmit capability information including information regarding a beamforming capability of the UE; receive configuration information indicating a beamforming configuration, wherein the beamforming configuration is based at least in part on digital beamforming, analog beamforming, or a combination thereof; and communicate in accordance with the beamforming configuration.

In some aspects, a base station for wireless communication may include a memory and one or more processors coupled to the memory. The memory and the one or more processors may be configured to receive capability information including information regarding a beamforming capability of a UE; transmit configuration information indicating a beamforming configuration, wherein the beamforming configuration is based at least in part on digital beamforming, analog beamforming, or a combination thereof; and communicate based at least in part on the beamforming configuration.

In some aspects, a non-transitory computer-readable medium may store one or more instructions for wireless communication. The one or more instructions, when executed by one or more processors of a UE, may cause the one or more processors to transmit capability information including information regarding a beamforming capability of the UE; receive configuration information indicating a beamforming configuration, wherein the beamforming configuration is based at least in part on digital beamforming, analog beamforming, or a combination thereof; and communicate in accordance with the beamforming configuration.

In some aspects, a non-transitory computer-readable medium may store one or more instructions for wireless communication. The one or more instructions, when executed by one or more processors of a UE, may cause the one or more processors to receive capability information including information regarding a beamforming capability of a UE; transmit configuration information indicating a beamforming configuration, wherein the beamforming configuration is based at least in part on digital beamforming, analog beamforming, or a combination thereof; and communicate based at least in part on the beamforming configuration.

In some aspects, an apparatus for wireless communication may include means for transmitting capability information including information regarding a beamforming capability of the apparatus; means for receiving configuration information indicating a beamforming configuration, wherein the beamforming configuration is based at least in part on digital beamforming, analog beamforming, or a combination thereof; and means for communicating in accordance with the beamforming configuration.

In some aspects, an apparatus for wireless communication may include means for receiving capability information including information regarding a beamforming capability of a UE; means for transmitting configuration information indicating a beamforming configuration, wherein the beamforming configuration is based at least in part on digital beamforming, analog beamforming, or a combination thereof; and means for communicating based at least in part on the beamforming configuration.

In some aspects, a method of wireless communication, performed by a UE, may include transmitting an indication of an analog to digital converter (ADC) resolution associated with a beamforming mode of the UE; and receiving an indication of whether to use the digital beamforming mode to receive one or more downlink communications.

In some aspects, a method of wireless communication, performed by a base station, may include receiving an indication of an ADC resolution associated with a beamforming mode of a UE; and transmitting, to the UE, an indication of whether to use the digital beamforming mode to receive one or more downlink communications.

In some aspects, a non-transitory computer-readable medium may store one or more instructions for wireless communication. The one or more instructions, when executed by one or more processors of a UE, may cause the one or more processors to transmit an indication of an ADC resolution associated with a beamforming mode of the UE; and receive an indication of whether to use the digital beamforming mode to receive one or more downlink communications.

In some aspects, a non-transitory computer-readable medium may store one or more instructions for wireless communication. The one or more instructions, when executed by one or more processors of a base station, may cause the one or more processors to receive an indication of an ADC resolution associated with a beamforming mode of a UE; and transmit, to the UE, an indication of whether to use the digital beamforming mode to receive one or more downlink communications.

In some aspects, a UE for wireless communication may include a memory and one or more processors coupled to the memory. The memory and the one or more processors may be configured to transmit an indication of an ADC resolution associated with a beamforming mode of the UE; and receive an indication of whether to use the digital beamforming mode to receive one or more downlink communications.

In some aspects, a base station for wireless communication may include a memory and one or more processors coupled to the memory. The memory and the one or more processors may be configured to receive an indication of an ADC resolution associated with a beamforming mode of a UE; and transmit, to the UE, an indication of whether to use the digital beamforming mode to receive one or more downlink communications.

In some aspects, an apparatus for wireless communication may include means for transmitting an indication of an ADC resolution associated with a beamforming mode of the apparatus; and means for receiving an indication of whether to use the digital beamforming mode to receive one or more downlink communications.

In some aspects, an apparatus for wireless communication may include means for receiving an indication of an ADC resolution associated with a beamforming mode of a UE; and means for transmitting, to the UE, an indication of whether to use the digital beamforming mode to receive one or more downlink communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
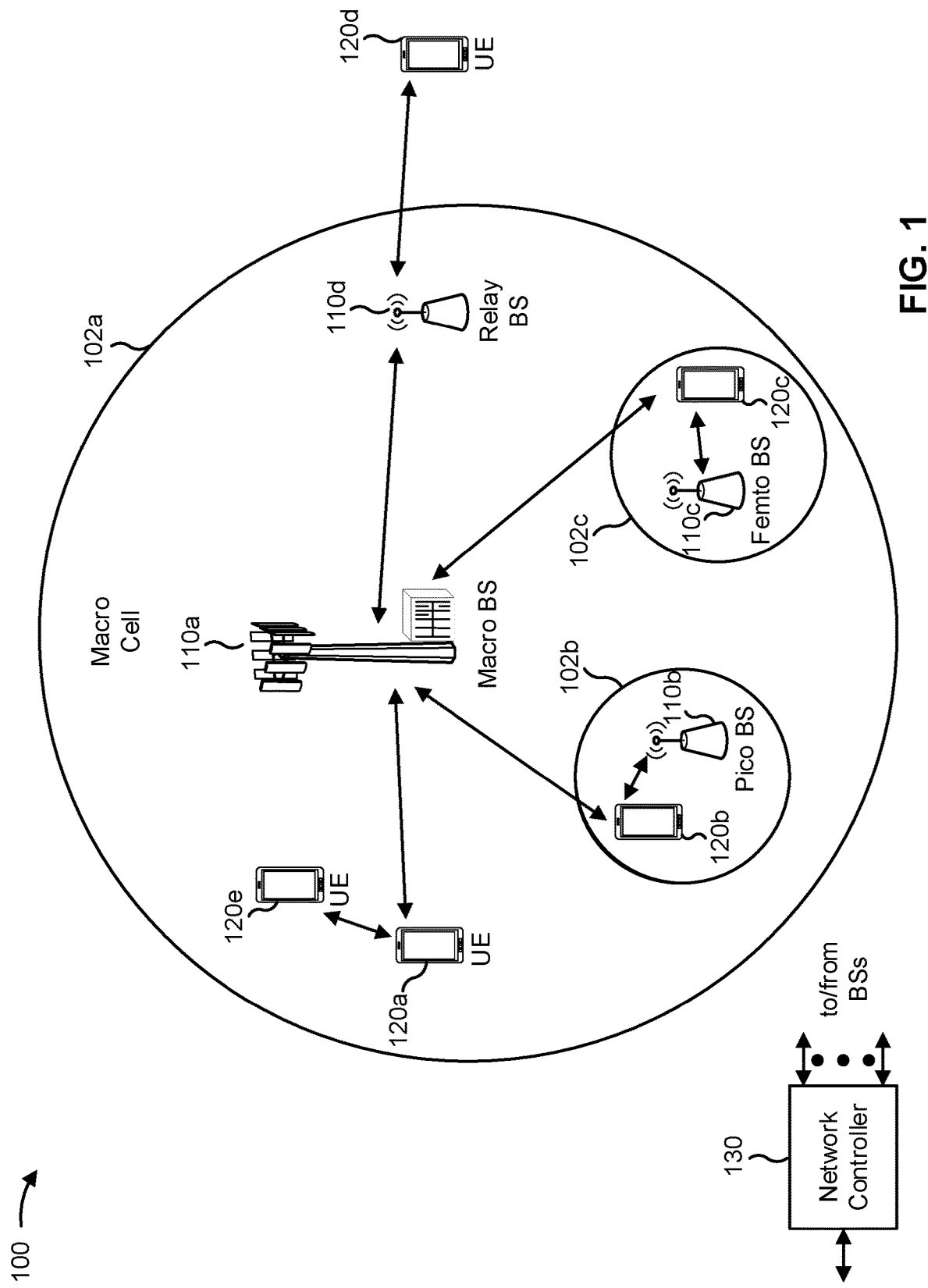
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

A frequency may also be referred to as a carrier, a frequency channel, or the like.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
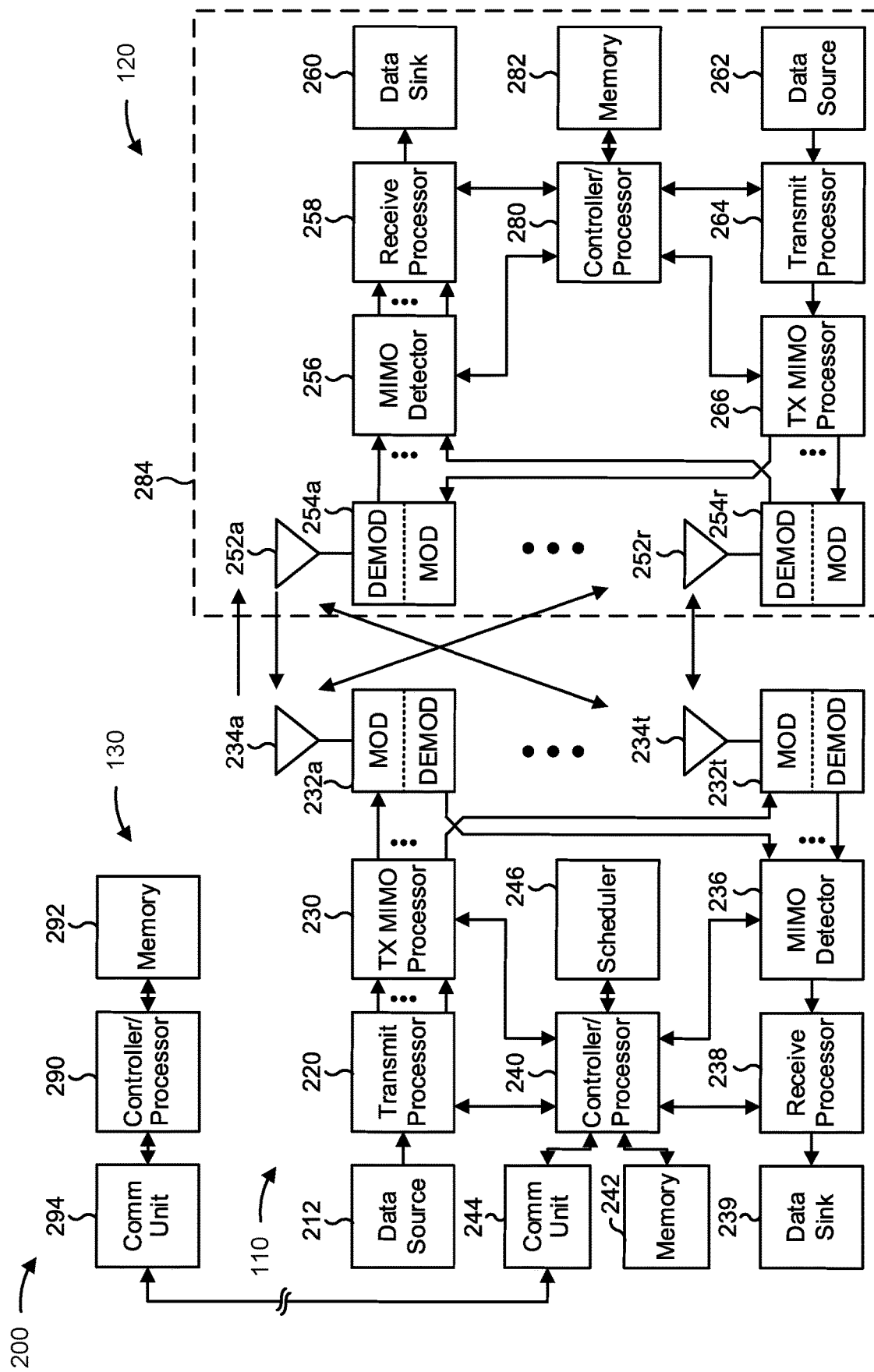
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-9).

Controller/processor 240 of base station 110, controller/processor 280 of UE 120, and/or any other component(s) of FIG. 2 may perform one or more techniques associated with capability signaling for digital beamforming, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for transmitting capability information including information regarding a beamforming capability of the UE 120; means for receiving configuration information indicating a beamforming configuration, wherein the beamforming configuration is based at least in part on digital beamforming, analog beamforming, or a combination thereof; means for communicating in accordance with the beamforming configuration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving capability information including information regarding a beamforming capability of a UE; means for transmitting configuration information indicating a beamforming configuration, wherein the beamforming configuration is based at least in part on digital beamforming, analog beamforming, or a combination thereof; means for communicating based at least in part on the beamforming configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
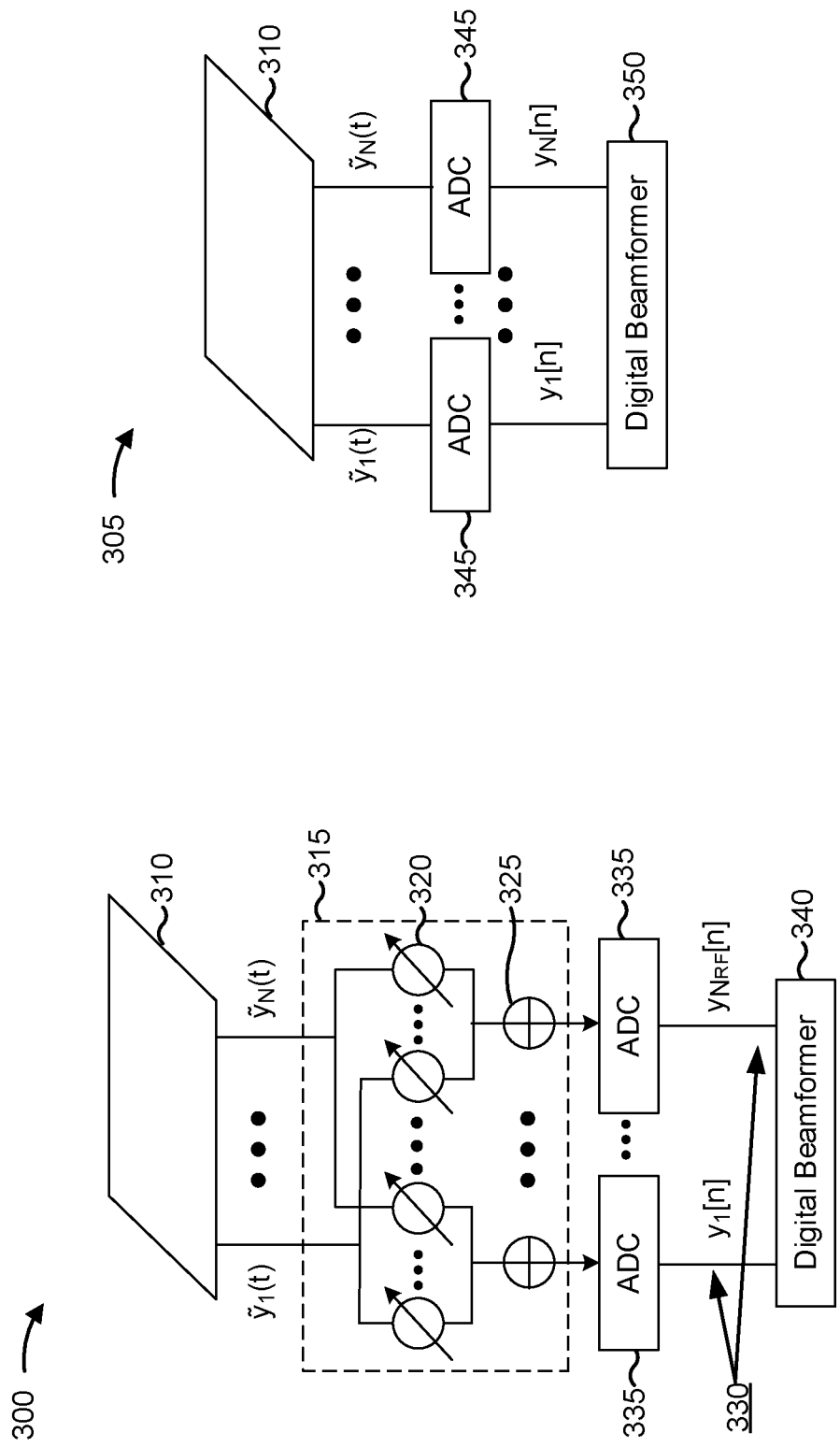
FIGS. 3 and 4 are diagrams illustrating one or more examples of beamforming architectures that support beamforming for millimeter wave communications, in accordance with the present disclosure.

FIG. 3 is a diagram illustrating examples of beamforming architectures 300 and 305 that support beamforming for millimeter wave communications, in accordance with the present disclosure. In some aspects, architecture 300 and/or 305 may implement aspects of wireless network 100. In some aspects, architectures 300 and/or 305 may be implemented in a receiving device (e.g., a wireless communication device, UE, or base station), as described herein. For example, the architectures 300 and 305 may show receive chains (e.g., radio frequency (RF) chains) for reception of communications by a receiving device. The architectures 300 and 305, and the architectures 400 and 405, may be particularly useful for communication in a millimeter wave range, such as FR2 and/or the like.

FIG. 3 is a diagram illustrating example hardware components of a wireless communication device in accordance with certain aspects of the disclosure. The illustrated components may include those that may be used for antenna element selection and/or for beamforming for reception of wireless signals. There are numerous architectures for antenna element selection and implementing phase shifting, only two examples of which are illustrated here. Transmission lines or other waveguides, wires, traces, and/or the like are shown connecting the various components to illustrate how signals to be transmitted may travel between components.

Architecture 300 includes a hybrid beamforming architecture. Architecture 305 includes a fully digital beamforming architecture. The architectures 300 and 305 include an antenna array 310. The antenna array 310 may include N antenna elements (not shown). An antenna element may include one or more sub-elements for radiating or receiving RF signals. For example, a single antenna element may include a first sub-element cross-polarized with a second sub-element that can be used to independently transmit or receive cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

A signal $\tilde{y}_n(t)$ received at an antenna n at a time t may propagate to an analog portion 315 of the architecture 300. The analog portion 315 may include a plurality of phase shifters 320 and one or more amplifiers 325 (e.g., one amplifier 325 per RF chain, multiple amplifiers 325 per RF chain, or one amplifier 325 for multiple RF chains).

The architecture 300 includes a plurality of RF chains 330 (e.g., $N_{RF}$ RF chains). $N_{RF}$ may be smaller than N (e.g., the number of RF chains 330 may be smaller than the number of antenna elements of the architecture 300). In some examples, $N_{RF}$ may be 2 or 4, or another number, such as 6. If $N_{RF}$=N, then the architecture 300 would be a digital beamforming architecture (as shown by reference number 305). An architecture including a plurality of RF chains 330 and analog phase shifters and amplifiers may be referred to as a hybrid beamforming architecture. An architecture including a single RF chain (e.g., $N_{RF}$=1), or an architecture including two RF chains corresponding to different polarizations, may be referred to as an analog beamforming architecture. An architecture 305 including a digital beamformer without analog phase shifters and amplifiers may be referred to as a digital beamforming architecture or a digital-only beamforming architecture.

Each RF chain 330 of architecture 300 may be associated with a respective analog-to-digital converter (ADC) 335. The ADCs 335 of the RF chains 330 may perform analog-to-digital conversion of the signals received from the analog portion 315. The ADCs 335 may provide digital signals $y_1[n]$ through $y_{N_{RF}}[n]$ to a digital beamformer 340. The digital beamformer 340 may be implemented at the baseband or may interface with a baseband processor. The digital beamformer 340 may perform digital-domain signal processing, such as digital baseband processing, controlling operation of components 310/315/320/325/335, spatial configuration of the communication of the wireless communication device, and so on.

The architecture 305 omits the analog portion 315 (e.g., the phase shifters 320, the amplifiers 325, and so on). As shown, the architecture 305 provides an ADC 345 per antenna element (e.g., N ADCs 345 for the N antenna elements). The wireless communication device may receive signals via antenna elements of the antenna array 310, provide the signals to the ADCs 345, convert the signals to the digital domain, then process the signals by the digital beamformer 350. In the architecture 305, the digital beamformer 350 handles phase shifting, mixing, and/or other operations handled by the analog portion 315 of the architecture 300.

In some aspects, an ADC 335/345 may be associated with a bit granularity. An ADC 335/345 may receive an analog signal, which is generally not quantized, and may output a digital signal that is quantized in accordance with the bit granularity. For example, a 4-bit ADC may output a 4-bit quantization of a signal, whereas an 8-bit ADC may output an 8-bit quantization of a signal. Generally, higher-bit-granularity ADCs (e.g., 8-bit ADCs) are associated with a larger baseband processing burden and higher power consumption than lower-bit-granularity ADCs (e.g., 3-bit or 4-bit ADCs).

The digital beamforming architecture 305 may provide increased flexibility for spatial signal processing relative to the hybrid beamforming architecture 300, which may facilitate maximum ratio combining, individual adjustment of antenna phase, and so on. However, at a given bit granularity of ADC, the increased number of ADCs 345 associated with the digital beamforming architecture 305 may create a significantly heavier processing and power burden at the digital beamformer 350 than at the digital beamformer 340 of the hybrid beamforming architecture 300. For example, the hybrid beamforming architecture 300 may be expected to have $N_{RF}$ ADCs 335, whereas the digital beamforming architecture 305 may be expected to have N ADCs 345. To mitigate this processing and power burden, some digital beamforming architectures 300 may use ADCs with a lower bit granularity than an ADC 335. For example, a 3-bit or 4-bit granularity for ADC 345 may reduce baseband processing load and power consumption relative to an 8-bit granularity for ADC 345, and may still provide performance benefits over some hybrid beamforming architectures 300, even those associated with higher ADC bit granularities, such as 8 bits. It should be noted that the techniques described herein can be applied for hybrid beamforming architectures as well as digital beamforming architectures.

A wireless communication device may be implemented with architecture 300 and/or architecture 305. The wireless communication device may be configured to use one of a set of architectures for communicating with a base station. However, a static selection of a single architecture may limit benefits of having the wireless communication device implemented with multiple architectures. In some aspects, static selection of the single architecture may consume computing, communication, network, and/or power resources by using the single architecture to transmit and/or receive communications. For example, the single architecture may be efficient (e.g., use an appropriate spectral efficiency, resolution, and/or power consumption and/or the like) for a first set of communications and another architecture may be efficient for a second set of communications.

As indicated above, FIG. 3 is provided as an example. Other examples may differ from what is described with regard to FIG. 3.

Figure 4:
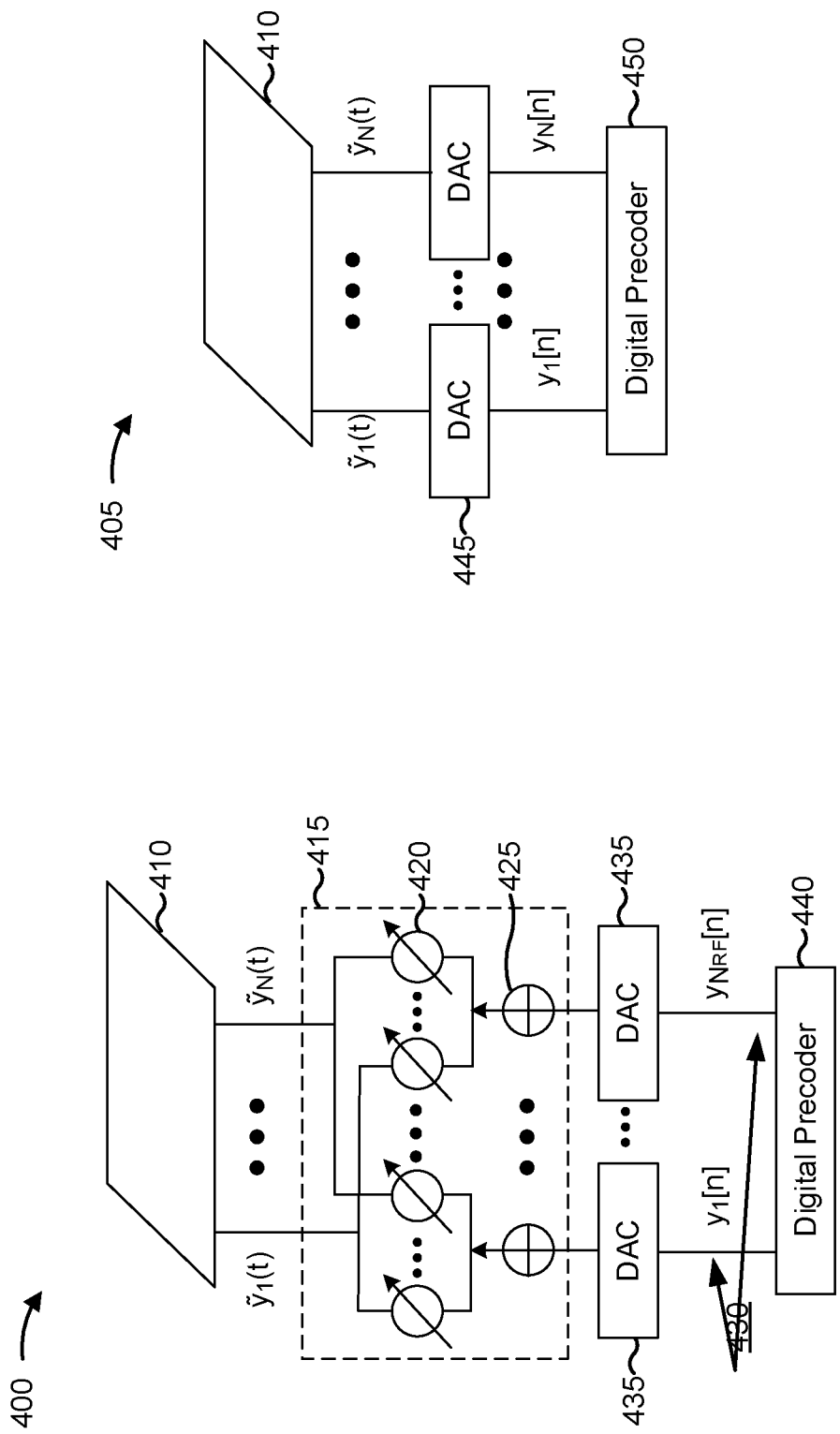

FIG. 4 is a diagram illustrating examples of beamforming architectures 400 and 405 that support beamforming for millimeter wave communications, in accordance with the present disclosure. In some aspects, architecture 400 and/or 405 may implement aspects of wireless network 100. In some aspects, architectures 400 and/or 405 may be implemented in a transmitting device (e.g., a wireless communication device, UE, or base station), as described herein. For example, the architectures 400 and 405 may show transmission chains (e.g., radio frequency (RF) chains) for transmission of communications by a transmitting device.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only two examples of which are illustrated here. Transmission lines or other waveguides, wires, traces, and/or the like are shown connecting the various components to illustrate how signals to be transmitted may travel between components.

Architecture 400 includes a hybrid beamforming architecture. Architecture 405 includes a fully digital beamforming architecture. The architectures 400 and 405 include an antenna array 410. The antenna array 410 may include N antenna elements (not shown). An antenna element may include one or more sub-elements for radiating or receiving RF signals. For example, a single antenna element may include a first sub-element cross-polarized with a second sub-element that can be used to independently transmit or receive cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

A signal $\tilde{y}_n(t)$ to be transmitted at an antenna n at a time t may propagate to the antenna n via an analog portion 415 of the architecture 400. The analog portion 415 may include a plurality of phase shifters 420 and one or more amplifiers 425 (e.g., one amplifier 425 per RF chain, multiple amplifiers 425 per RF chain, or one amplifier 425 for multiple RF chains).

The architecture 400 includes a plurality of RF chains 430 (e.g., $N_{RF}$ RF chains). $N_{RF}$ may be smaller than N (e.g., the number of RF chains 430 may be smaller than the number of antenna elements of the architecture 400). In some examples, $N_{RF}$ may be 2 or 4, or another number, such as 6. If $N_{RF}=N$, then the architecture 400 would be a digital beamforming architecture (as shown by reference number 405). An architecture including a plurality of RF chains 430 and analog phase shifters and amplifiers may be referred to as a hybrid beamforming architecture. An architecture including a single RF chain (e.g., $N_{RF}=1$), or an architecture including two RF chains corresponding to different polarizations, may be referred to as an analog beamforming architecture. An architecture 405 including a digital beamformer without analog phase shifters and amplifiers may be referred to as a digital beamforming architecture or a digital-only beamforming architecture.

Each RF chain 430 of architecture 400 may be associated with a respective digital-to-analog converter (DAC) 435. The DACs 435 of the RF chains 430 may perform digital-to-analog conversion of the signals before providing the signals to the analog portion 415. The DACs 435 may receive digital signals $y_1[n]$ through $y_{N_{RF}}[n]$ from a digital precoder 440. The digital precoder 440 may be implemented at the baseband or may interface with a baseband processor. The digital precoder 440 may perform digital-domain signal processing, such as digital baseband processing, controlling operation of components 410/415/420/425/435, spatial configuration of the communication of the wireless communication device, and so on.

The architecture 405 omits the analog portion 415 (e.g., the phase shifters 420, the amplifiers 425, and so on). As shown, the architecture 405 provides a DAC 445 per antenna element (e.g., N DACs 445 for the N antenna elements). The wireless communication device may transmit signals via antenna elements of the antenna array 410, as received via the DACs 445. The. DACs 445 may convert the signals to the analog domain from the digital domain, as received from the digital precoder 450. In the architecture 405, the digital precoder 450 handles phase shifting, mixing, and/or other operations handled by the analog portion 415 of the architecture 400.

In some aspects, an DAC 435/445 may be associated with a bit granularity. A DAC 435/445 may receive a digital signal, which is generally quantized according to the bit granularity, and may output an analog signal that is not quantized. For example, a 4-bit DAC may receive a 4-bit quantization of a signal, whereas an 8-bit DAC may receive an 8-bit quantization of a signal. Generally, higher-bit-granularity DACs (e.g., 8-bit DACs) are associated with a larger baseband processing burden and higher power consumption than lower-bit-granularity DACs (e.g., 3-bit or 4-bit DACs).

The digital beamforming architecture 405 may provide increased flexibility for spatial signal processing relative to the hybrid beamforming architecture 400, which may facilitate maximum ratio combining, individual adjustment of antenna phase, and so on. However, at a given bit granularity of DAC, the increased number of DACs 445 associated with the digital beamforming architecture 405 may create a significantly heavier processing and power burden at the digital beamformer 450 than at the digital precoder 440 of the hybrid beamforming architecture 400. For example, the hybrid beamforming architecture 400 may be expected to have $N_{RF}$ DACs 435 whereas the digital beamforming architecture 405 may be expected to have N DACs 445. To mitigate this processing and power burden, some digital beamforming architectures 400 may use DACs with a lower bit granularity than a DAC 435. For example, a 3-bit or 4-bit granularity for DAC 445 may reduce baseband processing load and power consumption relative to an 8-bit granularity for DAC 445, and may still provide performance benefits over some hybrid beamforming architectures 400, even those associated with higher DAC bit granularities, such as 8 bits. It should be noted that the techniques described herein can be applied for hybrid beamforming architectures as well as digital beamforming architectures.

A wireless communication device may be implemented with architecture 400 and/or architecture 405. The wireless communication device may be configured to use one of a set of architectures for communicating with a base station. However, a static selection of a single architecture may limit benefits of having the wireless communication device implemented with multiple architectures. In some aspects, static selection of the single architecture may consume computing, communication, network, and/or power resources by using the single architecture to transmit and/or receive communications. For example, the single architecture may be efficient (e.g., use an appropriate spectral efficiency, resolution, and/or power consumption and/or the like) for a first set of communications and another architecture may be efficient for a second set of communications.

As indicated above, FIG. 4 is provided as an example. Other examples may differ from what is described with regard to FIG. 4.

Different UEs may have different capabilities regarding beamforming configurations. For example, a UE may be associated with a digital beamforming architecture, a hybrid beamforming architecture, an analog beamforming architecture, or a combination thereof. Furthermore, within a type of architecture, different UEs may have different capabilities due to the number of antenna elements of a UE, the number of RF chains of the UE, the resolution of ADCs of the UE, and/or the like. As another example, a digital beamforming mode may use various resolutions (sometimes referred to as bit granularities), which are advantageous in various scenarios, or which may be out of reach for some UE architectures. These differences may lead to incongruity in the reception performance of the UE. For example, a UE may not be capable of receiving a data channel using a same beamforming configuration as a control channel. If a base station attempts to configure a beamforming configuration that is incompatible with the capabilities of the UE, throughput and efficiency may be reduced, and power consumption of the UE may be increased.

Some techniques and apparatuses described herein provide signaling of capability information regarding a beamforming capability of a UE. For example, the UE may signal whether the UE supports digital beamforming, hybrid beamforming, analog beamforming, or a combination thereof. As another example, the UE may signal one or more ADC resolutions associated with a beamforming mode (e.g., using a digital beamforming architecture or a hybrid beamforming architecture) of the UE. In some aspects, the capability information may be specific to a channel type. For example, the UE may signal a first capability for a control channel, a second capability for a data channel, and/or a third capability for a control and data channel. Furthermore, in some aspects, the digital beamforming configuration may be configured without a default beam for a shared channel. For example, digital beamforming may involve a shorter scheduling offset than analog/hybrid beamforming, which may eliminate the need for a default beam for a shared channel. In this way, efficiency of configuration of the UE for digital, analog, or hybrid beamforming is improved. Thus, power usage of the UE may be reduced and the likelihood of the UE being configured with an incompatible beamforming configuration is reduced. In some aspects, the techniques and apparatuses described herein may be particularly useful for millimeter wave communications, though the techniques and apparatuses described herein can be applied in frequency ranges other than millimeter wave. Furthermore, the techniques and apparatuses described herein enable increased flexibility for DAC/ADC configuration and resolution for hybrid or digital beamforming architectures by supporting capability signaling for various combinations of DAC/ADC quantities and resolutions (e.g., 8 antennas at the UE and 4 ADCs with 6-bit resolution, 8 antennas at the UE and 6 ADCs with 5-bit resolution, 8 antennas at UE and 8 ADCs with 4-bit resolution, and so on). In some aspects, the operations described herein with regard to ADC resolutions can also be performed for DAC resolutions. In some aspects, ADC resolutions and DAC resolutions are interchangeable.

In some aspects described herein, a wireless communication device (e.g., a UE 120) may report an ADC resolution associated with a beamforming mode or a hybrid beamforming mode of the wireless communication device. In some aspects, the wireless communication device may set the ADC resolution based at least in part on one or more conditions, settings, and/or the like of the wireless communication device. For example, the wireless communication device may determine to use a relatively high ADC resolution to increase throughput at the expense of power consumption, or may use a relatively low ADC resolution to decrease power consumption at the expense of throughput. The wireless communication device may transmit an indication of the ADC resolution to a base station (e.g., base station 110).

The base station may determine whether the UE is to use the digital beamforming mode or another beamforming mode based on one or more performance parameters. For example, the base station may determine a peak achievable throughput for the UE when in the digital beamforming mode, based at least in part on the ADC resolution. In some aspects, the base station may transmit an indication of a beamforming mode that the UE is to use for one or more communications. The UE may configure the beamforming mode based at least in part on the indication of the beamforming mode and may receive communication from the base station based at least in part on the configured beamforming mode.

In this way, the base station may determine a beamforming mode for the UE that is based at least in part on a setting of an ADC resolution associated with the beamforming mode of the UE instead of relying on a maximum ADC associated with the beamforming mode of the UE. This beamforming mode can be a digital beamforming mode or a hybrid beamforming mode. This may conserve computing, communication, and/or network resources that may otherwise be consumed by transmitting and/or receiving communications that are based at least in part on an assumption that the ADC resolution associated with the beamforming mode is the maximum ADC resolution associated with the beamforming mode.

Figure 5:
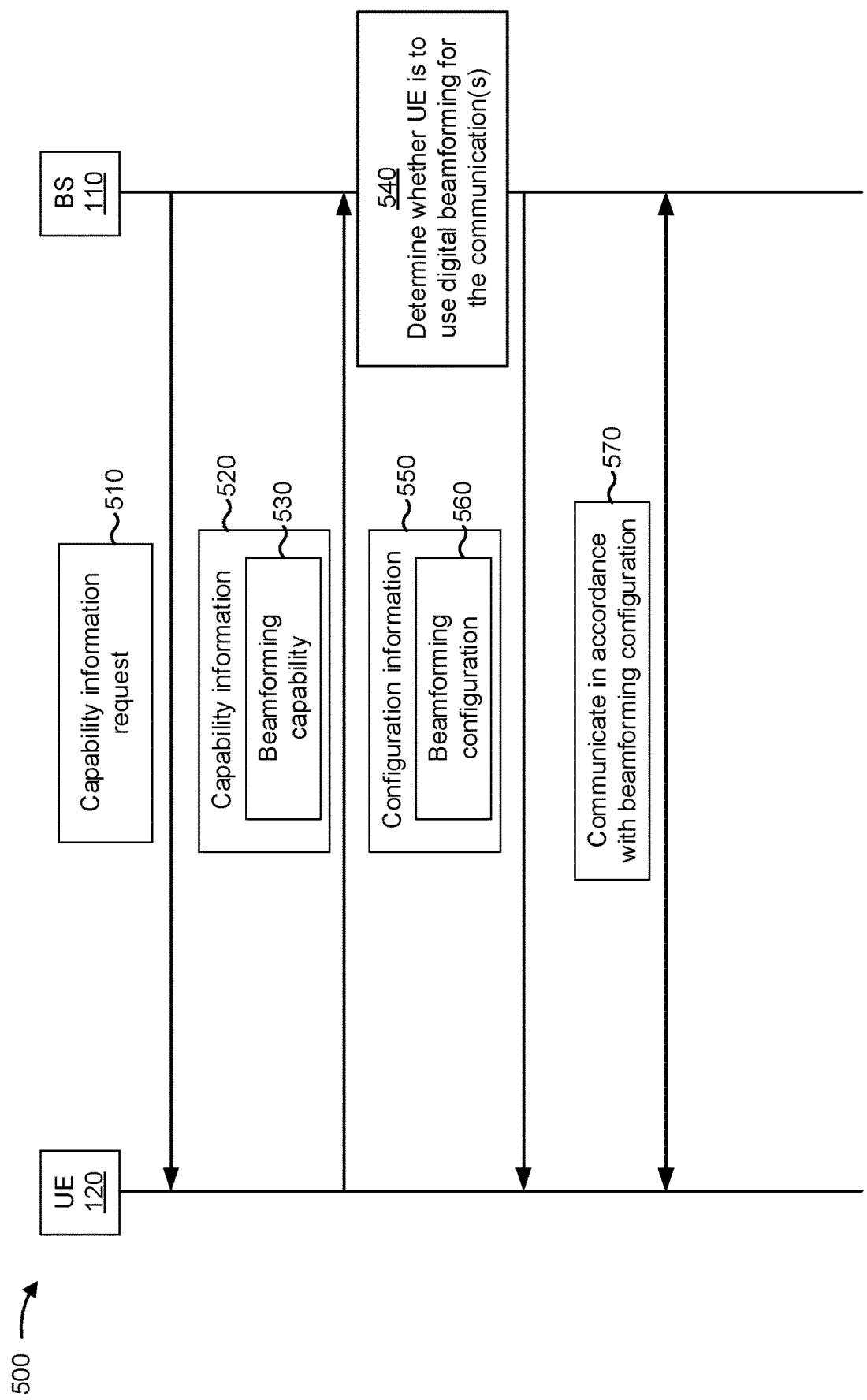
FIG. 5 is a diagram illustrating an example of capability reporting for a digital beamforming configuration, in accordance with the present disclosure.

FIG. 5 is a diagram illustrating an example 500 of capability reporting for a digital beamforming configuration, in accordance with the present disclosure. As shown, example 500 includes a UE 120 and a BS 110. The UE 120 may include at least one of a digital beamforming architecture (e.g., architecture 305/405 of FIGS. 3 and 4) or a hybrid beamforming architecture (e.g., architectures 300/400 of FIGS. 3 and 4). For example, the UE 120 may be capable of switching between a digital beamforming mode that uses the architecture 305/405 and a hybrid beamforming mode that uses the architecture 300/400. In some aspects, the UE 120 may be capable of using an analog beamforming mode, in which a single RF chain (or two RF chains corresponding to different polarizations) is used for communications by the UE 120. In some aspects, the base station and the UE may communicate using a frequency that satisfies a frequency threshold (e.g., a frequency that is within FR2, within FR4, above approximately 28 GHz, and/or the like).

As shown by reference number 510, the BS 110 may transmit a capability information request to the UE 120. The capability information request may request capability information from the UE 120. In some aspects, the requested capability information may relate to digital beamforming. For example, the BS 110 may request the capability information relating to a beamforming capability described in connection with reference number 530 below.

In some aspects, the capability information request, or configuration information transmitted by the BS 110 (not shown), may indicate that the UE 120 is to determine an ADC resolution (e.g., 1 bit, 2 bits, 3 bits, 4 bits, 5 bits, or the like) associated with a beamforming mode of the UE 120 (such as associated with a digital beamforming architecture or a hybrid beamforming architecture). For example, the UE 120 may dynamically determine a current or future setting of a digital beamforming mode. The configuration information may indicate that the UE 120 is to transmit an indication of the ADC resolution to the base station 110. In some aspects, the configuration information may indicate that the UE 120 is to transmit the indication of the ADC resolution when the UE 120 establishes a connection with the base station 110 (e.g., an RRC connect communication), when the UE 120 changes ADC resolution, when the UE 120 transmits a resource request, and/or the like. In some aspects, the configuration information may indicate a message type, a message format, and/or the like for the UE 120 to use for transmitting the indication of the ADC resolution.

In some aspects (not shown), the UE 120 may determine the ADC resolution of digital beamforming for one or more communications. For example, the UE may determine the ADC resolution associated with the beamforming mode of the UE based at least in part on a power condition of the UE (e.g., a power state, a power setting, a power headroom, a power limitation, and/or the like), a heat condition of the UE (e.g., a temperature, a temperature setting, and/or the like), a desired throughput for one or more downlink communications, and/or the like. In some aspects, the ADC resolution associated with the beamforming mode may be less than a maximum ADC resolution that the UE supports.

As shown by reference number 520, the UE 120 may transmit capability information to the BS 110 based at least in part on the capability information request. In some aspects, the UE 120 may transmit the capability information in a UE capability report. As shown by reference number 530, the capability information may indicate a beamforming capability of the UE 120. For example, the capability information may indicate a support for a digital beamforming mode for a millimeter wave frequency, such as a frequency associated with Frequency Range 2 (FR2) or Frequency Range 4 (FR4) of 5G/NR. As another example, the capability information may indicate an ADC resolution, such as associated with a digital beamforming mode or a hybrid beamforming mode.

In some aspects, the beamforming capability may indicate different capabilities for different types of channels. For example, the beamforming capability may indicate different capabilities for data channels and control channels. More particularly, the beamforming capability may indicate that the UE 120 is capable of using 2 receive ports for physical downlink control channel (PDCCH) reception and 8 receive ports for physical downlink shared (PDSCH) reception. In some aspects, the beamforming capability may indicate that the UE 120 supports a hybrid beamforming mode, a digital beamforming mode, or a combination thereof for a type of channel. For example, the beamforming capability may indicate that the UE 120 supports a hybrid beamforming mode for PDCCH reception (e.g., with 2 receive ports, corresponding to 2 RF chains) and a digital beamforming mode for PDSCH reception (e.g., with 8 receive points corresponding to 8 antenna elements). In some aspects, the beamforming capability may indicate a capability for receiving data and control transmissions. For example, the beamforming capability may indicate that the UE 120 supports a digital beamforming mode for reception of control and data transmissions.

In some aspects, the beamforming capability may indicate an ADC resolution of digital beamforming. For example, the UE 120 may transmit an indication of an ADC resolution associated with the beamforming mode of the UE 120 (e.g., the beamforming capability may include the indication of the ADC resolution). The ADC resolution may be associated with an ADC resolution that is current, future, expected, and/or the like. The indication of the ADC resolution may indicate that the UE 120 intends to operate with the ADC resolution for one or more communications. For example, the UE 120 may indicate that the UE 120 intends to operate with the ADC resolution for an amount of time, for a number of communications, for a configured set of communications (e.g., for communications associated with a configured grant), until the UE 120 transmits another indication of an ADC resolution, and/or the like. In some aspects, the UE 120 may dynamically transmit the indication of the ADC resolution using, for example, a physical uplink control channel (PUCCH) message, one or more MAC CEs, and/or the like.

As shown by reference number 540, the base station 110 may determine whether the UE 120 is to use digital beamforming for the one or more communications. In some aspects, the base station 110 may determine whether the UE 120 is to use the digital beamforming mode based at least in part on the indicated ADC resolution associated with the beamforming mode of the UE 120. For example, the base station 110 may determine a peak achievable throughput for the UE 120 using the indicated ADC resolution and may determine whether the UE 120 is to use the digital beamforming mode based at least in part on the peak achievable throughput.

Additionally, or alternatively, the base station 110 may determine whether the UE 120 is to use the digital beamforming mode based at least in part on an ADC resolution associated with an analog beamforming mode of the UE 120, an ADC resolution associated with a hybrid beamforming mode of the UE 120, a desired throughput of the one or more downlink communications, and/or the like. In some aspects, the base station 110 may determine which beamforming mode the UE 120 is to use for the one or more communications. For example, the base station 110 may determine which beamforming mode the UE 120 is to use for the one or more communications based at least in part on a peak achievable throughput for the UE 120 using the indicated ADC resolution for the digital beamforming mode and/or a peak achievable throughput for the UE 120 using the ADC resolutions associated with one or more other beamforming modes that the UE 120 supports.

As shown by reference number 550, the BS 110 may transmit configuration information to the UE 120. For example, the BS 110 may transmit the configuration information using medium access control (MAC) signaling (e.g., a MAC control element (MAC-CE)), downlink control information (DCI), radio resource control (RRC) signaling, one or more configured grants and/or the like. As shown by reference number 560, the configuration information may include a beamforming configuration for the UE 120. For example, the configuration information may indicate a beamforming mode to be used by the UE 120 (e.g., a digital beamforming mode, a hybrid beamforming mode, or an analog beamforming mode). In some aspects, the configuration information may indicate a beamforming mode to be used for a channel or a communication. For example, the configuration information may indicate that a hybrid beamforming configuration (e.g., with 2 RF chains at the UE 120) is to be used for receiving control communications, thereby increasing the reliability of the control communications. As another example, the configuration information may indicate that a digital beamforming configuration (e.g., with 8 RF chains and/or receive ports corresponding to 8 antenna elements) is to be used for receiving data communications, thereby increasing the throughput of such data communications. As yet another example, the configuration information may indicate that a digital beamforming configuration is to be used for receiving data and control communications.

An analog or hybrid beamforming mode may be associated with certain analog beam constraints due to the characteristics of the architecture 300 and the hardware configuration of the UE 120. The digital beamforming mode may not be associated with such analog beam constraints, since the digital beamforming mode does not utilize an analog portion (e.g., analog portion 315/415) and can thus implement a variety of beams on a shorter timescale than an analog or hybrid beamforming mode. In some aspects, for a digital beamforming mode, the configuration information may not indicate a default beam for a PDSCH. For example, "default beam" may refer to a beam used to receive a PDSCH if a gap between DCI scheduling the PDSCH and the PDSCH fails to satisfy a threshold. The default beam may be a same beam as is used to transmit the configuration information, or may be a preconfigured beam. In example 500, if the configuration information indicates that a digital beamforming mode is to be used, the configuration information may not indicate a default beam. For example, in this case, the configuration information may not identify a beam to be used to receive the PDSCH, irrespective of whether the gap between the DCI and the PDSCH fails to satisfy the threshold. Thus, the DCI used to schedule a PDSCH can indicate a beam for reception of the PDSCH irrespective of the gap between the DCI and the PDSCH, thereby improving flexibility of scheduling and resource utilization.

In some aspects, the UE 120 may configure a beamforming mode based at least in part on the configuration information. In some aspects, the UE may select, based at least in part on an indication of whether to use digital beamforming, one of a set of beamforming modes that the UE 120 supports. For example, the UE 120 may select the digital beamforming mode using the indicated ADC resolution, a hybrid beamforming mode (which may use the indicated ADC resolution), an analog beamforming mode, and/or the like. In some aspects, the set of beamforming modes that the UE 120 supports may be based at least in part on components of the UE 120 (e.g., beamforming architecture).

As shown by reference number 570, the BS 110 and the UE 120 may communicate in accordance with the beamforming configuration. For example, the UE 120 may use one or more configured beamforming modes (e.g., digital, hybrid, analog, or a combination thereof) to receive data communications, control communications, and/or control and data communications. In some aspects, based at least in part on the UE 120 reporting an ADC resolution associated with a beamforming mode, the base station may determine a beamforming mode for the one or more communications that is based at least in part on a setting of the ADC resolution instead of relying on a maximum ADC associated with the beamforming mode of the UE 120. This may conserve computing, communication, and/or network resources that may otherwise be consumed based at least in part on transmitting and/or receiving communications that are based at least in part on an assumption that the ADC resolution associated with the beamforming mode is the maximum ADC resolution associated with the beamforming mode.

As indicated above, FIG. 5 is provided as an example. Other examples may differ from what is described with regard to FIG. 5.

Figure 6:
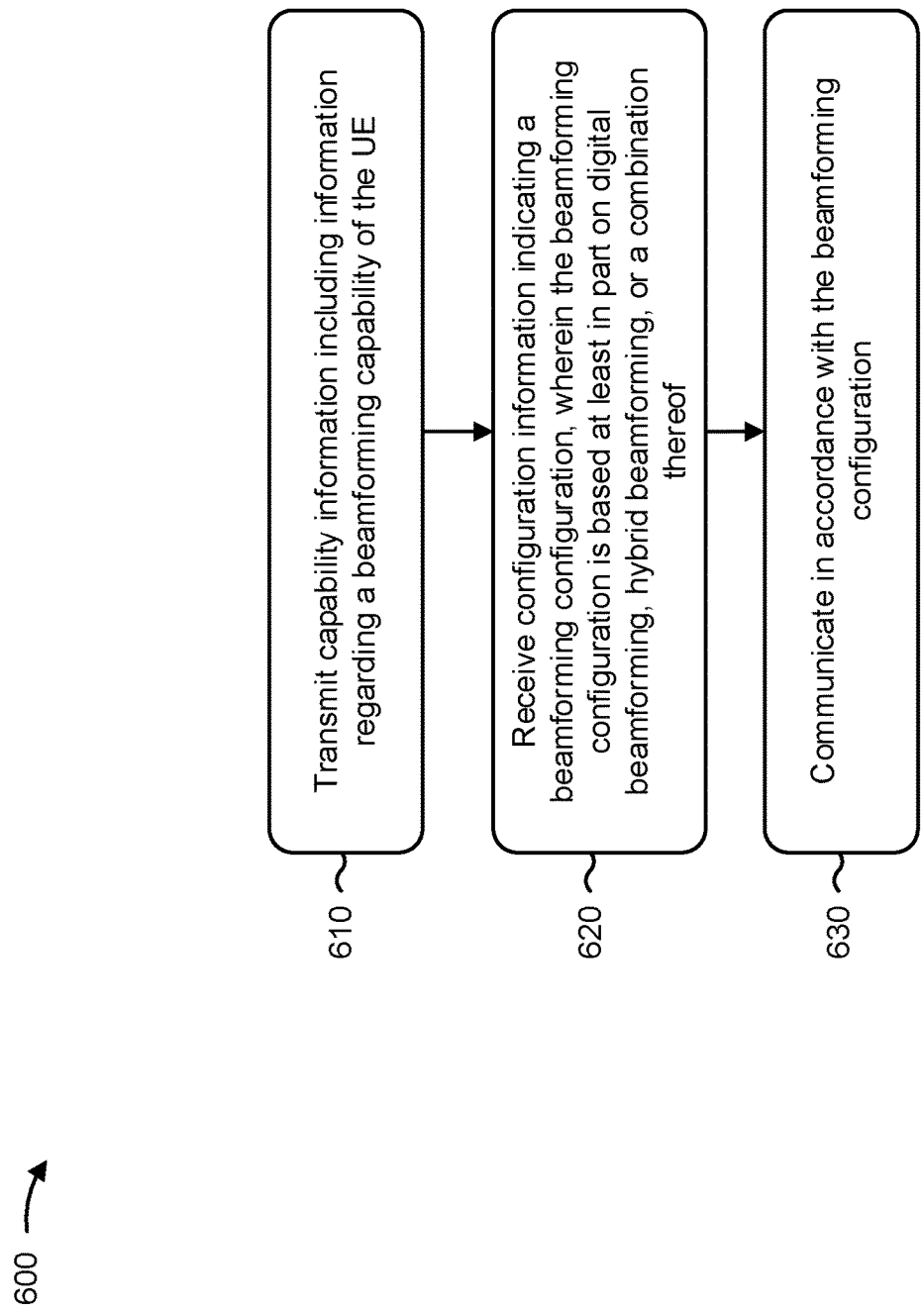
FIGS. 6-9 are diagrams illustrating example processes associated with capability reporting for a digital beamforming configuration, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with capability report for digital beamforming configuration.

As shown in FIG. 6, in some aspects, process 600 may include transmitting capability information including information regarding a beamforming capability of the UE (block 610). For example, the UE (e.g., using controller/processor 280, transmit processor 264, TX MIMO processor 266, MOD 254, antenna 252, and/or the like) may transmit capability information including information regarding a beamforming capability of the UE, as described above. In some aspects, the UE may transmit the capability information based at least in part on receiving a capability information request from a BS. In some aspects, the beamforming capability is a digital beamforming capability.

As further shown in FIG. 6, in some aspects, process 600 may include receiving configuration information indicating a beamforming configuration, wherein the beamforming configuration is based at least in part on digital beamforming, analog beamforming, or a combination thereof (block 620). For example, the UE (e.g., using antenna 252, DEMOD 254, MIMO detector 256, receive processor 258, controller/processor 280, and/or the like) may receive configuration information indicating a beamforming configuration, as described above. In some aspects, the beamforming configuration is based at least in part on digital beamforming, hybrid beamforming, analog beamforming, or a combination thereof. For example, the beamforming configuration may indicate to use a digital beamforming mode for some communications and a hybrid beamforming mode for other communications. In some aspects, the beamforming configuration may be based at least in part on analog beamforming.

As further shown in FIG. 6, in some aspects, process 600 may include communicating in accordance with the beamforming configuration (block 630). For example, the UE (e.g., using antenna 252, DEMOD 254, MIMO detector 256, receive processor 258, controller/processor 280, and/or the like) may communicate in accordance with the beamforming configuration, as described above.

Process 600 may include additional aspects, such as any single aspect or any combination of aspects described below and/or in connection with one or more other processes described elsewhere herein.

In a first aspect, the information regarding the beamforming capability of the UE is associated with a millimeter wave frequency.

In a second aspect, alone or in combination with the first aspect, the capability information is included in a UE capability report.

In a third aspect, alone or in combination with one or more of the first and second aspects, the capability information indicates a first beamforming capability for a data communication and a second beamforming capability for a control communication.

In a fourth aspect, alone or in combination with one or more of the first through third aspects, the configuration information indicates a first beamforming configuration, corresponding to the first beamforming capability, for the data communication, and a second beamforming configuration, corresponding to the second beamforming capability, for the control communication.

In a fifth aspect, alone or in combination with one or more of the first through fourth aspects, the first beamforming configuration is a digital beamforming configuration and the second beamforming configuration is a hybrid beamforming configuration.

In a sixth aspect, alone or in combination with one or more of the first through fifth aspects, the configuration information indicates a third beamforming configuration for a data and control transmission.

In a seventh aspect, alone or in combination with one or more of the first through sixth aspects, the third beamforming configuration is a digital beamforming configuration.

In an eighth aspect, alone or in combination with one or more of the first through seventh aspects, the configuration information is received via medium access control signaling or downlink control information.

In a ninth aspect, alone or in combination with one or more of the first through eighth aspects, a scheduling offset between receiving the configuration information and performing the communication fails to satisfy a threshold, and the communication is performed using a transmission configuration indicator state indicated by scheduling information associated with the communication.

In a tenth aspect, alone or in combination with one or more of the first through ninth aspects, communicating in accordance with the beamforming configuration further comprises communicating in accordance with the beamforming configuration using a frequency that satisfies a frequency threshold.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
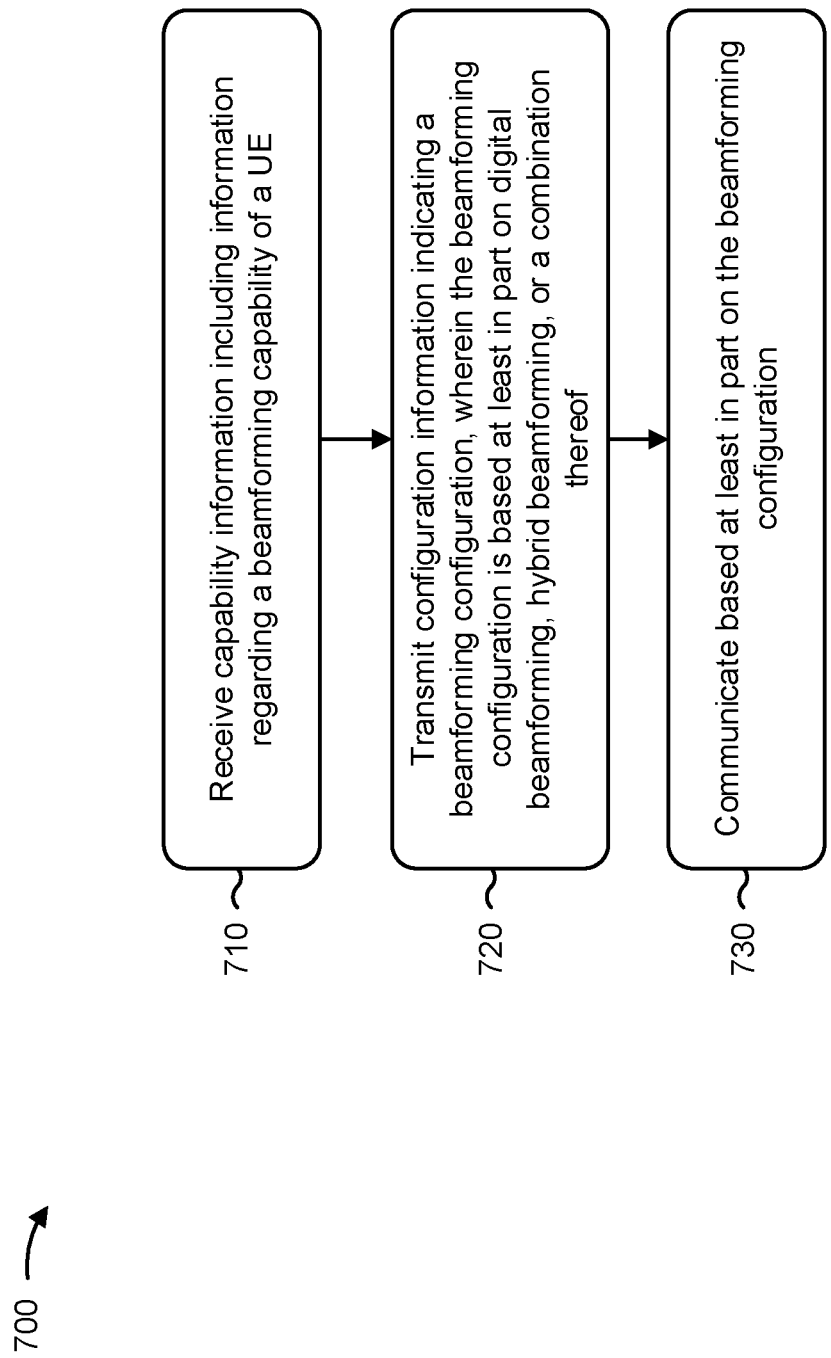

FIG. 7 is a diagram illustrating an example process 700 performed, for example, by a base station, in accordance with the present disclosure. Example process 700 is an example where the base station (e.g., BS 110 and/or the like) performs operations associated with capability report for digital beamforming configuration.

As shown in FIG. 7, in some aspects, process 700 may include receiving capability information including information regarding a beamforming capability of a UE (block 710). For example, the base station (e.g., using antenna 234, DEMOD 232, MIMO detector 236, receive processor 238, controller/processor 240, and/or the like) may receive capability information including information regarding a beamforming capability of a UE, as described above.

As further shown in FIG. 7, in some aspects, process 700 may include transmitting configuration information indicating a beamforming configuration, wherein the beamforming configuration is based at least in part on digital beamforming, analog beamforming, or a combination thereof (block 720). For example, the base station (e.g., using controller/processor 240, transmit processor 220, TX MIMO processor 230, MOD 232, antenna 234, and/or the like) may transmit configuration information indicating a beamforming configuration, as described above. In some aspects, the beamforming configuration is based at least in part on digital beamforming, hybrid beamforming, analog beamforming, or a combination thereof. For example, the beamforming configuration may indicate to use a digital beamforming mode for some communications and a hybrid beamforming mode for other communications. In some aspects, the beamforming configuration may be based at least in part on analog beamforming.

As further shown in FIG. 7, in some aspects, process 700 may include communicating based at least in part on the beamforming configuration (block 730). For example, the base station (e.g., using controller/processor 240, transmit processor 220, TX MIMO processor 230, MOD 232, antenna 234, and/or the like) may communicate based at least in part on the beamforming configuration, as described above.

Process 700 may include additional aspects, such as any single aspect or any combination of aspects described below and/or in connection with one or more other processes described elsewhere herein.

In a first aspect, the information regarding the beamforming capability of the UE is associated with a millimeter wave frequency.

In a second aspect, alone or in combination with the first aspect, the capability information is included in a UE capability report.

In a third aspect, alone or in combination with one or more of the first and second aspects, the capability information indicates a first beamforming capability for a data communication and a second beamforming capability for a control communication.

In a fourth aspect, alone or in combination with one or more of the first through third aspects, the configuration information indicates a first beamforming configuration, corresponding to the first beamforming capability, for the data communication, and a second beamforming configuration, corresponding to the second beamforming capability, for the control communication.

In a fifth aspect, alone or in combination with one or more of the first through fourth aspects, the first beamforming configuration is a digital beamforming configuration and the second beamforming configuration is a hybrid beamforming configuration.

In a sixth aspect, alone or in combination with one or more of the first through fifth aspects, the configuration information indicates a third beamforming configuration for a data and control transmission.

In a seventh aspect, alone or in combination with one or more of the first through sixth aspects, the third beamforming configuration is a digital beamforming configuration.

In an eighth aspect, alone or in combination with one or more of the first through seventh aspects, the configuration information is received via medium access control signaling or downlink control information.

In a ninth aspect, alone or in combination with one or more of the first through eighth aspects, a scheduling offset between receiving the configuration information and performing the communication fails to satisfy a threshold, and the communication is performed using a transmission configuration indicator state indicated by scheduling information associated with the communication.

In a tenth aspect, alone or in combination with one or more of the first through ninth aspects, communicating based at least in part on the beamforming configuration further comprises communicating based at least in part on the beamforming configuration using a frequency that satisfies a frequency threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
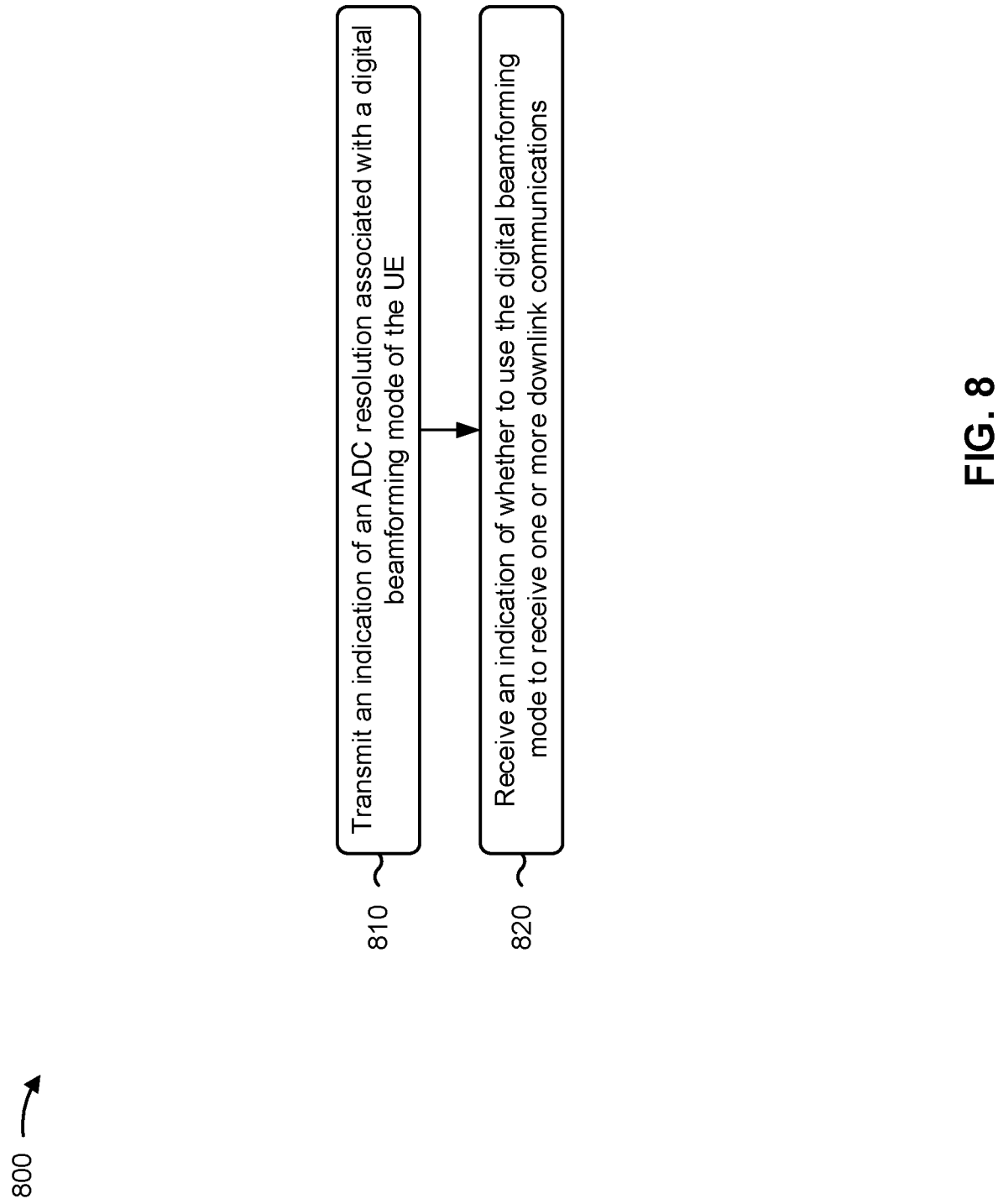

FIG. 8 is a diagram illustrating an example process 800 performed, for example, by a UE, in accordance with the present disclosure. Example process 800 is an example where the UE (e.g., UE 120 and/or the like) performs operations associated with transmitting indications of ADC resolution for a digital beamforming mode.

As shown in FIG. 8, in some aspects, process 800 may include transmitting an indication of an ADC resolution associated with a beamforming mode of the UE (block 810). For example, the UE (e.g., using transmit processor 264, controller/processor 280, memory 282, and/or the like) may transmit an indication of an ADC resolution associated with a beamforming mode of the UE, as described above.

As further shown in FIG. 8, in some aspects, process 800 may include receiving an indication of whether to use the digital beamforming mode to receive one or more downlink communications (block 820). For example, the UE (e.g., using receive processor 258, controller/processor 280, memory 282, and/or the like) may receive an indication of whether to use the digital beamforming mode to receive one or more downlink communications, as described above.

Process 800 may include additional aspects, such as any single aspect or any combination of aspects described below and/or in connection with one or more other processes described elsewhere herein.

In a first aspect, process 800 includes determining the ADC resolution associated with the beamforming mode of the UE, wherein the ADC resolution associated with the beamforming mode is less than a maximum ADC resolution that the UE supports.

In a second aspect, alone or in combination with the first aspect, determining the ADC resolution associated with the beamforming mode of the UE includes determining the ADC resolution associated with the beamforming mode of the UE based at least in part on one or more of: a power condition of the UE, a heat condition of the UE, or a desired throughput for the one or more downlink communications.

In a third aspect, alone or in combination with one or more of the first and second aspects, transmitting the indication of the ADC resolution associated with the beamforming mode of the UE includes transmitting the indication of the ADC resolution associated with the beamforming mode of the UE via one or more of a PUCCH message or one or more MAC CEs.

In a fourth aspect, alone or in combination with one or more of the first through third aspects, the indication of the ADC resolution is associated with the beamforming mode of the UE for downlink communications within frequency range 2 or frequency range 4.

In a fifth aspect, alone or in combination with one or more of the first through fourth aspects, process 800 includes receiving the one or more downlink communications based at least in part on the indication of whether to use the digital beamforming mode.

In a sixth aspect, alone or in combination with one or more of the first through fifth aspects, receiving the indication of whether to use the digital beamforming mode includes receiving the indication of whether to use the digital beamforming mode via a DCI communication, one or more MAC CEs, or RRC signaling.

In a seventh aspect, alone or in combination with one or more of the first through sixth aspects, receiving the indication of whether to use the digital beamforming mode includes receiving an indication of a selected beamforming mode, of a set of beamforming modes that includes the digital beamforming mode, to use to receive the one or more downlink communications.

In an eighth aspect, alone or in combination with one or more of the first through seventh aspects, process 800 includes receiving the one or more downlink communications using the selected beamforming mode until one or of: expiration of an amount of time for which the UE is to use the selected beamforming mode, receipt of a number of downlink communications for which the UE is to use the selected beamforming mode, or receipt of an indication to change from the selected beamforming mode.

In a ninth aspect, alone or in combination with one or more of the first through ninth aspects, the one or more downlink communications are associated with a frequency that satisfies a frequency threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
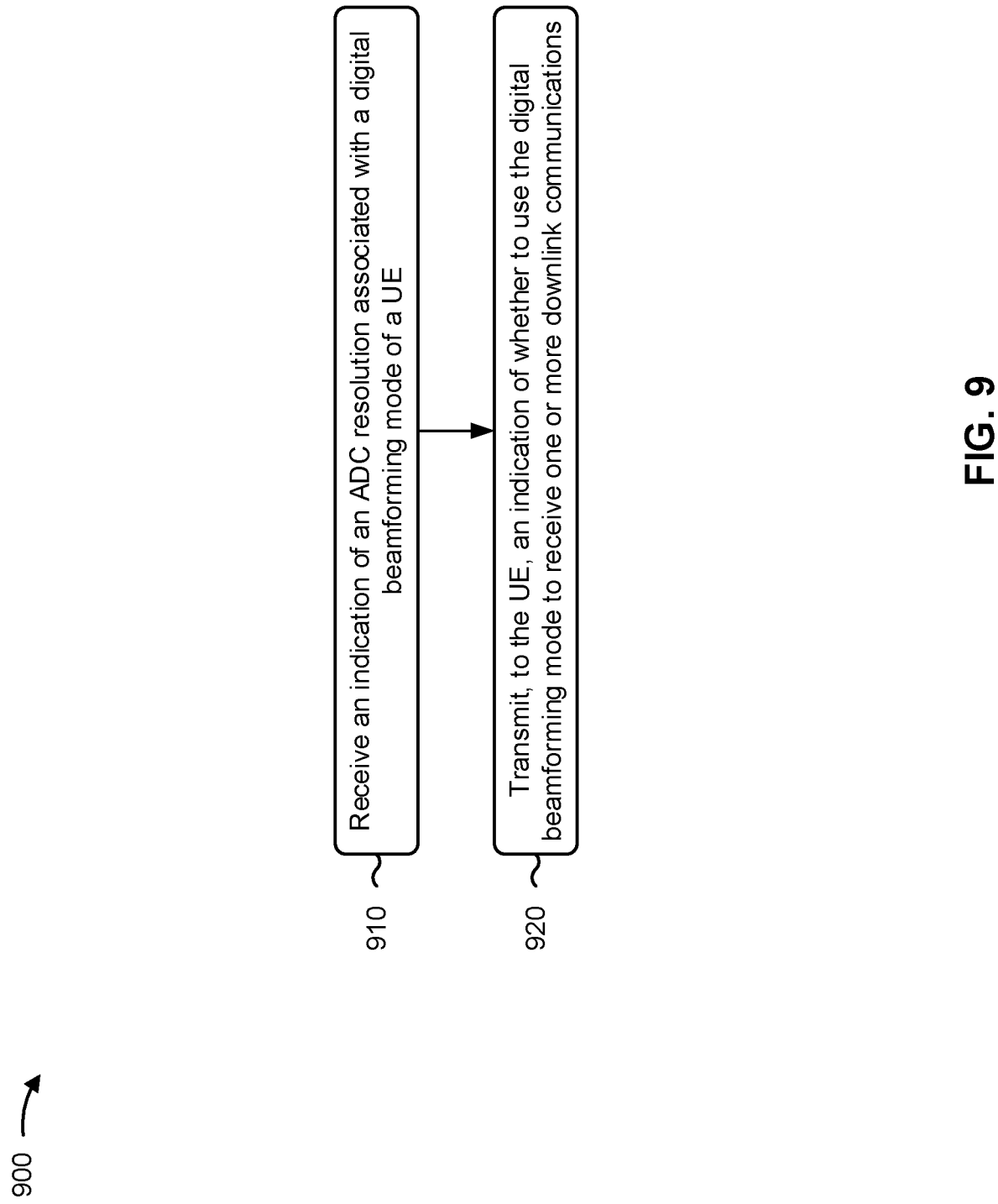

FIG. 9 is a diagram illustrating an example process 900 performed, for example, by a base station, in accordance with the present disclosure. Example process 900 is an example where the base station (e.g., base station 110 and/or the like) performs operations associated with receiving indications of ADC resolution for a digital beamforming mode.

As shown in FIG. 9, in some aspects, process 900 may include receiving an indication of an ADC resolution associated with a beamforming mode of a UE (block 910). For example, the base station (e.g., using receive processor 238, controller/processor 240, memory 242, and/or the like) may receive an indication of an ADC resolution associated with a beamforming mode of a UE, as described above.

As further shown in FIG. 9, in some aspects, process 900 may include transmitting, to the UE, an indication of whether to use the digital beamforming mode to receive one or more downlink communications (block 920). For example, the base station (e.g., using transmit processor 220, controller/processor 240, memory 242, and/or the like) may transmit, to the UE, an indication of whether to use the digital beamforming mode to receive one or more downlink communications, as described above.

Process 900 may include additional aspects, such as any single aspect or any combination of aspects described below and/or in connection with one or more other processes described elsewhere herein.

In a first aspect, process 900 includes determining whether the UE is to use the digital beamforming mode based at least in part on one or more of: the indicated ADC resolution associated with the beamforming mode of the UE, an ADC resolution associated with an analog beamforming mode of the UE, an ADC resolution associated with a hybrid beamforming mode of the UE, or a desired throughput of the one or more downlink communications.

In a second aspect, alone or in combination with the first aspect, receiving the indication of the ADC resolution associated with the beamforming mode of the UE includes receiving the indication of the ADC resolution associated with the beamforming mode of the UE via one or more of a PUCCH message or one or more MAC CEs.

In a third aspect, alone or in combination with one or more of the first and second aspects, the indication of the ADC resolution is associated with the beamforming mode of the UE for downlink communications within frequency range 2 or frequency range 4.

In a fourth aspect, alone or in combination with one or more of the first through third aspects, process 900 includes transmitting the one or more downlink communications based at least in part on the indication of whether to use the digital beamforming mode.

In a fifth aspect, alone or in combination with one or more of the first through fourth aspects, transmitting the indication of whether to use the digital beamforming mode includes transmitting the indication of whether to use the digital beamforming mode via a DCI communication, one or more MAC CEs, or RRC signaling.

In a sixth aspect, alone or in combination with one or more of the first through fifth aspects, transmitting the indication of whether to use the digital beamforming mode includes transmitting an indication of a selected beamforming mode, of a set of beamforming modes that includes the digital beamforming mode, for the UE to use to receive the one or more downlink communications.

In a seventh aspect, alone or in combination with one or more of the first through sixth aspects, process 900 includes transmitting the one or more downlink communications using the selected beamforming mode until one or of: expiration of an amount of time for which the UE is to use the selected beamforming mode, transmission of a number of downlink communications for which the UE is to use the selected beamforming mode, or transmission of an indication to change from the selected beamforming mode.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: transmitting capability information including information regarding a beamforming capability of the UE; receiving configuration information indicating a beamforming configuration, wherein the beamforming configuration is based at least in part on digital beamforming, analog beamforming, or a combination thereof; and communicating in accordance with the beamforming configuration.

Aspect 2: The method of Aspect 1, wherein the information regarding the beamforming capability of the UE is associated with a millimeter wave frequency.

Aspect 3: The method of any of Aspects 1-2, wherein the capability information is included in a UE capability report.

Aspect 4: The method of any of Aspects 1-3, wherein the capability information indicates a first beamforming capability for a data communication and a second beamforming capability for a control communication.

Aspect 5: The method of Aspect 4, wherein the configuration information indicates a first beamforming configuration, corresponding to the first beamforming capability, for the data communication, and a second beamforming configuration, corresponding to the second beamforming capability, for the control communication.

Aspect 6: The method of Aspect 5, wherein the first beamforming configuration is a digital beamforming configuration and the second beamforming configuration is a hybrid beamforming configuration.

Aspect 7: The method of Aspect 5, wherein the configuration information indicates a third beamforming configuration for a data and control transmission.

Aspect 8: The method of Aspect 7, wherein the third beamforming configuration is a digital beamforming configuration.

Aspect 9: The method of any of Aspects 1-8, wherein the configuration information is received via medium access control signaling or downlink control information.

Aspect 10: The method of any of Aspects 1-9, wherein a scheduling offset between receiving the configuration information and performing the communication fails to satisfy a threshold, and wherein the communication is performed using a transmission configuration indicator state indicated by scheduling information associated with the communication.

Aspect 11: The method of any of Aspects 1-10, wherein communicating in accordance with the beamforming configuration comprises: communicating in accordance with the beamforming configuration using a frequency that satisfies a frequency threshold.

Aspect 12: The method of any of Aspects 1-11, wherein the beamforming capability includes an indication of an analog to digital converter (ADC) resolution associated with a beamforming mode of the UE.

Aspect 13: The method of Aspect 12, further comprising: determining the ADC resolution associated with the beamforming mode of the UE, wherein the ADC resolution associated with the beamforming mode is less than a maximum ADC resolution that the UE supports.

Aspect 14: The method of Aspect 13, wherein determining the ADC resolution associated with the beamforming mode of the UE comprises: determining the ADC resolution associated with the beamforming mode of the UE based at least in part on one or more of: a power condition of the UE, a heat condition of the UE, or a desired throughput for the one or more downlink communications.

Aspect 15: The method of Aspect 12, wherein the indication of the ADC resolution is associated with a beamforming mode of the UE for downlink communications within frequency range 2 or frequency range 4.

Aspect 16: The method of any of Aspects 1-15, wherein the capability information is transmitted via one or more of a physical uplink control channel message or one or more medium access control control elements.

Aspect 17: The method of any of Aspects 1-16, wherein the configuration information is received via a downlink control information communication, one or more medium access control control elements, or radio resource control signaling.

Aspect 18: The method of any of Aspects 1-17, wherein the configuration information comprises an indication of a selected beamforming mode, of a set of beamforming modes that includes a digital beamforming mode, to use to receive the one or more downlink communications.

Aspect 19: The method of Aspect 18, further comprising: receiving one or more downlink communications using the selected beamforming mode until one or of: expiration of an amount of time for which the UE is to use the selected beamforming mode, receipt of a number of downlink communications for which the UE is to use the selected beamforming mode, or receipt of an indication to change from the selected beamforming mode.

Aspect 20: A method of wireless communication performed by a base station, comprising: receiving capability information including information regarding a beamforming capability of a user equipment (UE); transmitting configuration information indicating a beamforming configuration, wherein the beamforming configuration is based at least in part on digital beamforming, analog beamforming, or a combination thereof; and communicating based at least in part on the beamforming configuration.

Aspect 21: The method of Aspect 20, wherein the information regarding the beamforming capability of the UE is associated with a millimeter wave frequency.

Aspect 22: The method of any of Aspects 20-21, wherein the capability information is included in a UE capability report.

Aspect 23: The method of any of Aspects 20-22, wherein the capability information indicates a first beamforming capability for a data communication and a second beamforming capability for a control communication.

Aspect 24: The method of Aspect 23, wherein the configuration information indicates a first beamforming configuration, corresponding to the first beamforming capability, for the data communication, and a second beamforming configuration, corresponding to the second beamforming capability, for the control communication.

Aspect 25: The method of Aspect 24, wherein the first beamforming configuration is a digital beamforming configuration and the second beamforming configuration is a hybrid beamforming configuration.

Aspect 26: The method of Aspect 24, wherein the configuration information indicates a third beamforming configuration for a data and control transmission.

Aspect 27: The method of Aspect 26, wherein the third beamforming configuration is a digital beamforming configuration.

Aspect 28: The method of any of Aspects 20-27, wherein the configuration information is received via medium access control signaling or downlink control information.

Aspect 29: The method of any of Aspects 20-28, wherein a scheduling offset between receiving the configuration information and performing the communication fails to satisfy a threshold, and wherein the communication is performed using a transmission configuration indicator state indicated by scheduling information associated with the communication.

Aspect 30: The method of any of Aspects 20-29, wherein communicating based at least in part on the beamforming configuration comprises: communicating based at least in part on the beamforming configuration using a frequency that satisfies a frequency threshold.

Aspect 31: The method of any of Aspects 20-30, wherein the beamforming capability includes an indication of an analog to digital converter (ADC) resolution associated with a beamforming mode of the UE.

Aspect 32: The method of Aspect 31, further comprising: determining whether the UE is to use digital beamforming based at least in part on one or more of: the indicated ADC resolution associated with digital beamforming of the UE, an ADC resolution associated with an analog beamforming mode of the UE, an ADC resolution associated with a hybrid beamforming mode of the UE, or a desired throughput of one or more downlink communications.

Aspect 33: The method of Aspect 32, wherein determining the ADC resolution associated with the beamforming mode of the UE comprises: determining the ADC resolution associated with the beamforming mode of the UE based at least in part on one or more of: a power condition of the UE, a heat condition of the UE, or a desired throughput for the one or more downlink communications.

Aspect 34: The method of Aspect 31, wherein the indication of the ADC resolution is associated with a beamforming mode of the UE for downlink communications within frequency range 2 or frequency range 4.

Aspect 35: The method of any of Aspects 20-34, wherein the capability information is received via one or more of a physical uplink control channel message or one or more medium access control control elements.

Aspect 36: The method of any of Aspects 20-35, wherein the configuration information is received via a downlink control information communication, one or more medium access control control elements, or radio resource control signaling.

Aspect 37: The method of any of Aspects 20-36, wherein the configuration information comprises an indication of a selected beamforming mode, of a set of beamforming modes that includes a digital beamforming mode, to use to receive the one or more downlink communications.

Aspect 38: The method of Aspect 37, further comprising: receiving one or more downlink communications using the selected beamforming mode until one or of: expiration of an amount of time for which the UE is to use the selected beamforming mode, receipt of a number of downlink communications for which the UE is to use the selected beamforming mode, or receipt of an indication to change from the selected beamforming mode.

Aspect 39: An apparatus for wireless communication at a device, comprising a processor; memory coupled with the processor; and instructions stored in the memory and executable by the processor to cause the apparatus to perform the method of one or more of Aspects 1-38.

Aspect 40: A device for wireless communication, comprising a memory and one or more processors coupled to the memory, the one or more processors configured to perform the method of one or more of Aspects 1-38.

Aspect 41: An apparatus for wireless communication, comprising at least one means for performing the method of one or more of Aspects 1-38.

Aspect 42: A non-transitory computer-readable medium storing code for wireless communication, the code comprising instructions executable by a processor to perform the method of one or more of Aspects 1-38.

Aspect 43: A non-transitory computer-readable medium storing a set of instructions for wireless communication, the set of instructions comprising one or more instructions that, when executed by one or more processors of a device, cause the device to perform the method of one or more of Aspects 1-38.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      transmit capability information including information regarding a beamforming capability of the UE, the capability information indicating a bit granularity of an analog-to-digital converter (ADC) of the UE, the bit granularity being selected in accordance with a throughput for one or more communications;
      receive configuration information indicating a beamforming configuration, the beamforming configuration being selected in accordance with the capability information, and the beamforming configuration associated at least in part with digital beamforming, analog beamforming, or a combination thereof; and
      communicate the one or more communications in accordance with the beamforming configuration.

2. The apparatus of claim 1, wherein the information regarding the beamforming capability of the UE is associated with a millimeter wave frequency.

3. The apparatus of claim 1, wherein the capability information is included in a UE capability report.

4. The apparatus of claim 1, wherein the capability information indicates a first beamforming capability for a data communication and a second beamforming capability for a control communication.

5. The apparatus of claim 4, wherein the configuration information indicates a first beamforming configuration, corresponding to the first beamforming capability, for the data communication, and a second beamforming configuration, corresponding to the second beamforming capability, for the control communication.

6. The apparatus of claim 5, wherein the first beamforming configuration is a digital beamforming configuration and the second beamforming configuration is a hybrid or analog beamforming configuration.

7. The apparatus of claim 5, wherein the configuration information indicates a third beamforming configuration for a data and control transmission.

8. The apparatus of claim 7, wherein the third beamforming configuration is a digital beamforming configuration.

9. The apparatus of claim 1, wherein the configuration information is received via medium access control signaling or downlink control information.

10. The apparatus of claim 1, wherein a scheduling offset between the configuration information and a communication fails to satisfy a threshold, and wherein the communication is performed using a transmission configuration indicator state indicated by scheduling information associated with the communication.

11. The apparatus of claim 1, wherein the one or more processors, to communicate the one or more communications in accordance with the beamforming configuration, are configured to:
communicate the one or more communications in accordance with the beamforming configuration using a frequency that satisfies a frequency threshold.

12. The apparatus of claim 1, wherein the bit granularity is associated with a beamforming mode of the UE.

13. The apparatus of claim 12, wherein the one or more processors are further configured to:
select the bit granularity associated with the beamforming mode of the UE,
the bit granularity associated with the beamforming mode being less than a maximum ADC resolution that the UE supports.

14. The apparatus of claim 12, wherein the indication of the bit granularity is associated with a beamforming mode of the UE for downlink communications within frequency range 2 or frequency range 4.

15. The apparatus of claim 1, wherein the capability information is transmitted via one or more of a physical uplink control channel message or one or more medium access control control elements.

16. The apparatus of claim 1, wherein the configuration information is received via a downlink control information communication, one or more medium access control control elements, or radio resource control signaling.

17. The apparatus of claim 1, wherein the configuration information comprises an indication of a selected beamforming mode, of a set of beamforming modes that includes a digital beamforming mode, to use to receive the one or more communications.

18. An apparatus for wireless communication at a base station, comprising:
a memory; and
one or more processors, coupled to the memory, configured to:
receive capability information including information regarding a beamforming capability of a user equipment (UE), the capability information indicating a bit granularity of an analog-to-digital converter (ADC) of the UE, the bit granularity being selected in accordance with a throughput for one or more communications;
transmit configuration information indicating a beamforming configuration, the beamforming configuration being selected in accordance with the capability information, and the beamforming configuration associated at least in part with digital beamforming, analog beamforming, or a combination thereof; and
communicate the one or more communications at least in accordance with the beamforming configuration.

19. The apparatus of claim 18, wherein the information regarding the beamforming capability of the UE is associated with a millimeter wave frequency.

20. The apparatus of claim 18, wherein the capability information is included in a UE capability report.

21. The apparatus of claim 18, wherein the capability information indicates a first beamforming capability for a data communication and a second beamforming capability for a control communication.

22. The apparatus of claim 21, wherein the configuration information indicates a first beamforming configuration, corresponding to the first beamforming capability, for the data communication, and a second beamforming configuration, corresponding to the second beamforming capability, for the control communication.

23. The apparatus of claim 18, wherein the configuration information is received via medium access control signaling or downlink control information.

24. The apparatus of claim 18, wherein a scheduling offset between receiving the configuration information and a communication fails to satisfy a threshold, and wherein the communication is performed using a transmission configuration indicator state indicated by scheduling information associated with the communication.

25. The apparatus of claim 18, wherein the one or more processors, to communicate the one or more communications at least in accordance with the beamforming configuration, are configured to:
communicate the one or more communications at least in accordance with the beamforming configuration using a frequency that satisfies a frequency threshold.

26. The apparatus of claim 18, wherein the bit granularity is associated with a beamforming mode of the UE.

27. The apparatus of claim 26, wherein the indication of the bit granularity is associated with a beamforming mode of the UE for downlink communications within frequency range 2 or frequency range 4.

28. The apparatus of claim 18, wherein the capability information is received via one or more of a physical uplink control channel message or one or more medium access control control elements.

29. A method of wireless communication performed by a user equipment (UE), comprising:
transmitting capability information including information regarding a beamforming capability of the UE, the capability information indicating a bit granularity of an analog-to-digital converter (ADC) of the UE, the bit granularity being selected in accordance with a throughput for one or more communications;
receiving configuration information indicating a beamforming configuration, the beamforming configuration being selected in accordance with the capability information, and the beamforming configuration associated at least in part with digital beamforming, analog beamforming, or a combination thereof; and
communicating the one or more communications in accordance with the beamforming configuration.

30. A method of wireless communication performed by a base station, comprising:
receiving capability information including information regarding a beamforming capability of a user equipment (UE), the capability information indicating a bit granularity of an analog-to-digital converter (ADC) of the UE, the bit granularity being selected in accordance with a throughput for one or more communications;
transmitting configuration information indicating a beamforming configuration, the beamforming configuration being selected in accordance with the capability information, and the beamforming configuration associated at least in part with digital beamforming, analog beamforming, or a combination thereof; and communicating the one or more communications in accordance with the beamforming configuration.

* * * * *